United States Patent [19]
Crandall et al.

[11] Patent Number: 5,427,227
[45] Date of Patent: * Jun. 27, 1995

[54] BAGGAGE CONVEYOR SYSTEM

[75] Inventors: Carl A. Crandall; William G. Walker, both of Fort Worth; Charles G. Knight, Bedford, all of Tex.

[73] Assignee: Trinity Industries, Inc., Dallas, Tex.

[*] Notice: The portion of the term of this patent subsequent to May 17, 2011 has been disclaimed.

[21] Appl. No.: 242,712

[22] Filed: May 13, 1994

Related U.S. Application Data

[63] Continuation of Ser. No. 103,881, Aug. 5, 1993, Pat. No. 5,311,981, which is a continuation of Ser. No. 41,716, Apr. 1, 1993, Pat. No. 5,263,571.

[51] Int. Cl.6 .............................................. B65G 43/00
[52] U.S. Cl. .................. 198/502.1; 198/804; 40/472; 40/524
[58] Field of Search ...................... 198/502.1, 577, 804, 198/831, 850–853; 40/472, 476, 518, 524–528

[56] References Cited

U.S. PATENT DOCUMENTS

| | | | |
|---|---|---|---|
| 4,979,591 | 12/1990 | Habegger et al. | 198/502.1 X |
| 5,165,526 | 11/1992 | Conklin, Jr. | 198/804 |
| 5,176,239 | 1/1993 | Findlay et al. | 198/502.1 X |
| 5,209,340 | 5/1993 | Munkner et al. | 198/502.1 |
| 5,263,571 | 11/1993 | Crandall et al. | 198/502.1 |
| 5,280,831 | 1/1994 | Conklin, Jr. | 198/502.1 |
| 5,311,980 | 5/1994 | Munkner et al. | 198/502.1 |
| 5,311,981 | 5/1994 | Crandall et al. | 198/502.1 |

Primary Examiner—D. Glenn Dayoan
Attorney, Agent, or Firm—Baker & Botts

[57] ABSTRACT

A conveyor system (10) is manufactured or retrofitted to include porcelain enamel on steel pallets (22). The porcelain enamel on steel pallets (22) may have decorative designs (30). The pallets (22) are secured to pallet support members (16) that have wheels (18) secured to them. The pallets (22), support members (16) and wheels (18) travel along wheel tracks (14) that form an endless path under the influence of a motive force. Airport luggage carrousels may be retrofitted to include porcelain enamel on steel pallets (22) by removing the existing panels, fabricating porcelain enamel steel pallets (22) that are approximately the same size the previously used panels and then fastening the porcelain enamel on steel pallets (22) to the carousel (10).

12 Claims, 1 Drawing Sheet

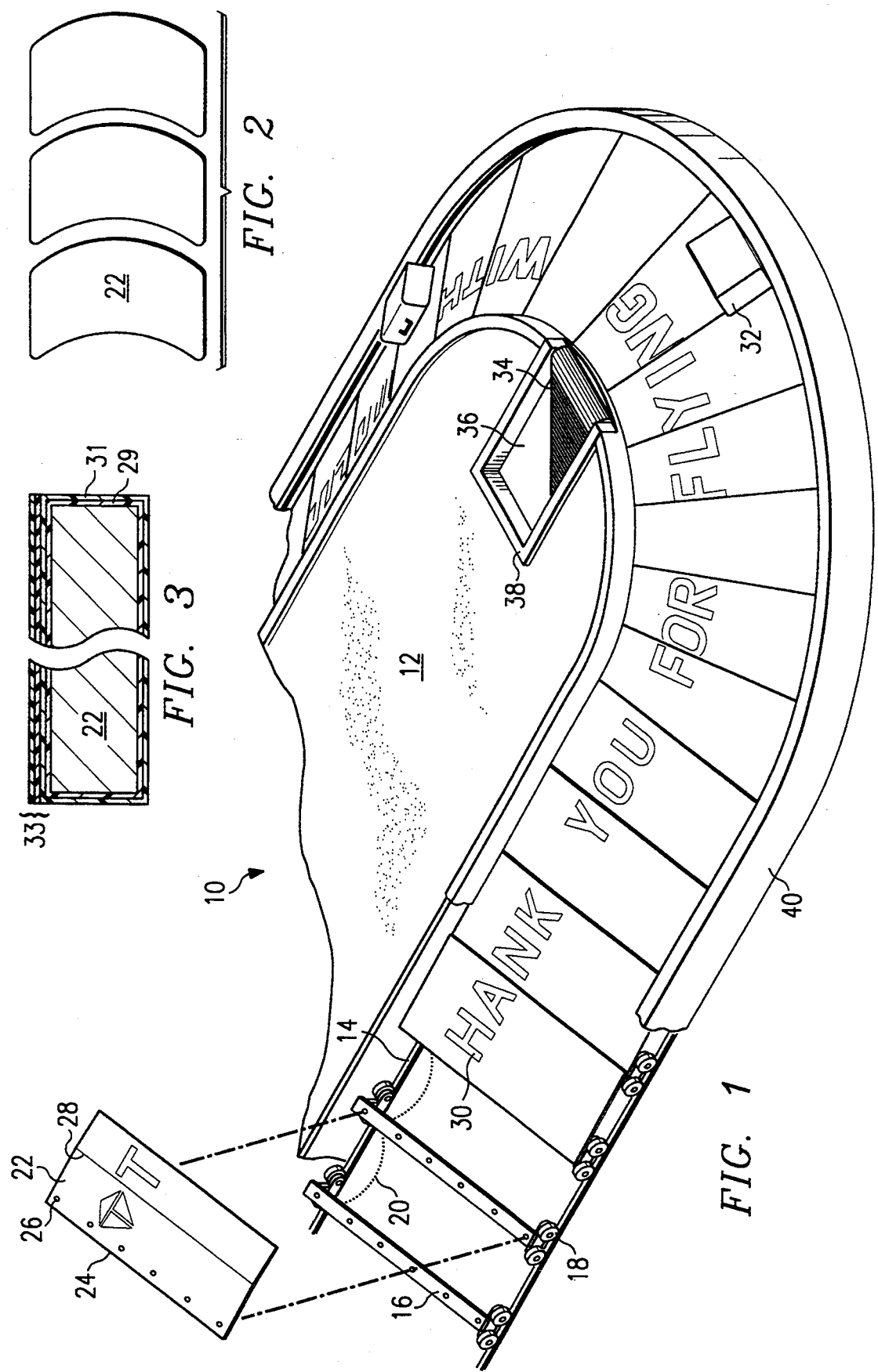

BAGGAGE CONVEYOR SYSTEM

CROSS REFERENCE TO RELATED APPLICATIONS

This application is a continuation application of U.S. application Ser. No. 08/103,881, filed Aug. 5, 1993 and entitled "Baggage Conveyor System", now U.S. Pat. No. 5,311,981, issued May 17, 1994, which is a continuation of U.S. application Ser. No. 08/041,716, filed Apr. 1, 1993, by Carl A. Crandall, William G. Walker and Charles G. Knight, and entitled "Baggage Conveyor System", now U.S. Pat. No. 5,263,571, issued Nov. 23, 1993.

TECHNICAL FIELD OF THE INVENTION

This invention relates to conveyor systems, and more particularly relates to an improved pallet for use on conveyor systems.

BACKGROUND OF THE INVENTION

Conveyor systems are used to move individual articles such as solids or free-flowing bulk materials over a horizontal, inclined, declined, or vertical path of travel typically with continuous motion. One type of conveyor system is often found at commercial airports and is for transporting luggage from a loading area to a baggage claim area where the luggage is moved in an endless pattern until claimed. The portion of this type of luggage conveyor system that typically moves the luggage in an endless pattern is frequently referred to as a luggage or baggage carousel.

In the past, luggage carrousels have frequently featured stainless steel pallets that overlap and move relative to one another during operation and upon which the luggage rests while being transported about the endless circulation pattern. The stainless steel pallets have comprised a considerable amount of the expense associated with constructing such a conveyor system and have occasionally developed problems with wear on the pallets. Additionally, the pallets have typically been void of colors or other indicia on the reflective surface of the stainless steel. While some efforts have been made to lower the cost and add indicia to pallets, those efforts have generally been unsatisfactory.

In one approach, decals with printed material or colors or other indicia on them have been applied to the stainless steel pallets. The decals do not lower cost and have experienced problems with wear. Another approach has been to form the panels or pallets from a transparent material such as a polycarbonate or other plastic material and to place printed materials underneath the transparent panels. See, e.g., U.S. Pat. No. 5,165,526. Installing and fabricating the transparent panels has involved considerable effort including mounting the printed material and then aligning the panels over the printed matter. Another problem with this approach has been that the plastic wears at an unsatisfactory rate requiring costly maintenance or replacement.

A need has thus arisen for an economical, easily fabricated and installed pallet for use in conveyor systems such as luggage carrousels that allows for durable decorative designs or other indicia to be applied to the pallet.

SUMMARY OF THE INVENTION

In accordance with the present invention, the disadvantages and problems associated with previously developed conveyor systems or conveyor system pallets have been substantially reduced or eliminated by use of the present conveyor system pallets. In accordance with one aspect of the present invention a conveyor pallet is fabricated of steel and coated with porcelain enamel.

In accordance with another aspect of the present invention, a conveyor pallet with multi-color decorative designs or other indicia is provided. In accordance with yet another aspect of the present invention a method of retrofitting luggage carrousels is provided that allows for the display of decorative designs and other indicia.

BRIEF DESCRIPTION OF THE DRAWINGS

For a more complete understanding of the present invention and the advantages thereof, reference is now made to the following description taken in conjunction with the accompanying drawings in which:

FIG. 1 is a perspective view of one embodiment of the present invention; and

FIG. 2 is a front view of one embodiment of the present invention.

FIG. 3 is a schematic cross section of one embodiment of a pallet constructed according to the present invention.

DETAILED DESCRIPTION OF THE INVENTION

The preferred embodiment of the present invention and its advantages are best understood by referring to FIGS. 1 and 2 of the drawings, like numerals being used for like and corresponding parts of the various drawings. Referring to FIG. 1, there is shown a luggage carousel 10 as frequently found in commercial airports. The luggage carousel 10 has a deck 12. Deck 12 is surrounded by support wheel tracks 14. Support wheel tracks 14 define an endless path that is frequently oval shaped. Evenly spaced along the wheel tracks 14 are pallet support members 16. Attached to each end of pallet support members 16 are support wheels 18. Support members 16 are configured to be transported along support wheel tracks 14 by the rolling of support wheels 18. The support members 16 are connected to each other at the top by straps 20 that run between support members 16. The bottoms are connected to each other by rigid links. Thus, the support members 16, the support wheels 18, and the straps 20 function in a manner analogous to a train on endless railroad tracks.

Attached to the pallet support members 16 are pallets 22. Pallets 22 are designed to overlap one another and are secured to pallet support members 16 to form a flexible surface somewhat analogous to the scales on a fish. The overlap configuration of the pallets 22 allows them to slide relative to each other as the pallets 22 travel around the corners of tracks 14. The leading edge 24 of the pallets 22 are secured to the support members 16 by fasteners, which may be applied to the pallet 22 at 26. Pallets 22 may have a slight bend to them to negotiate the curves in the unit 28.

Pallets 22 are made of steel or a similar material that can withstand temperatures as high as 1400 degrees Fahrenheit. The steel may be for example 16 gauge steel satisfying the requirements of ASTM specification A424, but other steels could be used as well. The steel pallets 22 then go through the porcelain enamel process. The process of forming porcelain enamel on steel is known in the art and is a process that is commercially available from companies such as American Porcelain Enamel Company of Dallas, Tex. The process involves three basic steps: fabricating, preparing the metal, and then processing.

Fabrication involves taking sheet steel or coil, cutting it to size by sheering, punching, or notching. Then forming the part by drawing, rolling, braking, or embossing. The part is then finished by welding, grinding, or supporting. The steel is then prepared by removing oils, drawing compounds, and soils. The steel is then pickled with acid to remove rust and welding oxides. The steel may be rinsed in between these steps. The porcelain enamel is then applied to the steel.

Referring to FIG. 3, there is shown a schematic cross section of one embodiment of pallet 22. The steel has a ground coat 29 of porcelain enamel applied to all the surfaces of the steel. The coat is dried and then fired in a furnace with a temperature of approximately 1400 degrees Fahrenheit. After applying the ground coat, a basic background or finishing coat 31 of porcelain enamel is applied to the surface of the steel, and the steel is again dried and fired in the same manner as previously described. The decorative designs may then be applied.

After the background coat is applied, one or more design coats 33 may be applied. For example, a first design coat may be applied to the top surface of the pallet 22 by spraying a porcelain enamel on the steel and allowing it to dry. After drying, the unwanted portions of the porcelain enamel may be removed by brushing or a similar process. The steel is then fired, which completes the application of the first design coat. This step of applying a design coat, removing the unwanted portions, and firing the steel can be repeated as many times as desired to add new colors and aspects to the design so that a multi-colored decorative design is applied. Another approach for applying design coats to the steel is to use a silk screen to apply the porcelain enamel in the areas where it is desired, drying the porcelain enamel, and then firing it. Other techniques are known in the art as well.

The porcelain enamel on steel process can be applied to the pallets 22 so that a scratch-resistant and tough porcelain enamel surface exists. The process of using design coats can be used to place a decorative design 30 on the pallets 22. The decorative design 30 may be art work or may be printed matter. The decorative design or printed matter 30 may be formed on one pallet or may stretch across numerous pallets. The porcelain enamel pallets 22 provide a surface for the luggage 32 to be received.

Luggage 32 is delivered to the carousel 10 on feeding conveyor 34. Feeding conveyor 34 causes the luggage 32 to drop onto the surface of the pallets 22. The luggage 32 rests on the pallets 22 as the pallets continuously move about the endless path defined by support wheel tracks 14. Feeding conveyor 34 transports the luggage 32 from a loading area, which is remote from the carousel 10, and through an opening 36 that has opening trim 38.

The support wheel tracks 14 and support wheels 18 are covered by fascia trim 40. The pallet support members 16 have a motive force applied to them typically by an electrical motor (not shown). The force causes the pallets to continuously move about the endless path defined by tracks 14.

The carousel 10 has been described for one embodiment with rectangular pallets 22, but it is to be understood that variations in pallet structure can be made. For example, the pallets 22 may be half-moon shaped as shown in FIG. 2. Additionally, the carousel 10 may be flat instead of inclined.

The porcelain enamel steel pallets 22 may be manufactured for new conveyor systems and airport carrousels, or may be manufactured to retrofit existing luggage carrousels 10. The retrofit would involve removing the existing pallets or panels from the carousel 10 and then fabricating steel pallets 22 with the same dimensions as the removed pallets and then applying a porcelain enamel ground and coat, and if desired, adding a decorative design such as a company logo or printed matter by applying a background coat and one or more design coats of porcelain enamel.

Although the present invention and its advantages have been described in detail, it should be understood that various changes, substitutions and alterations can be made herein without departing from the spirit and scope of the invention as defined by the appended claims.

What is claimed is:

1. A conveyor system for moving luggage comprising:
    a plurality of supporting members;
    a plurality of pallets coupled to the plurality of supporting members;
    a plurality of wheels attached to the plurality of supporting members;
    support wheel tracks forming an endless path for receiving the plurality of wheels;
    means for providing a motive force to the plurality of pallets to move the pallets around the endless path; and
    porcelain enamel indicia secured to the plurality of pallets for displaying a decorative design.

2. The conveyor system of claim 1 further comprising a plurality of straps attached between each of the plurality of pallets.

3. The conveyor system of claim 1 wherein the porcelain enamel indicia further comprises:
    a ground coat of porcelain enamel applied to the top surface of each pallet;
    a finishing coat of porcelain enamel applied to each pallet; and
    at least one design coat of porcelain enamel applied to each pallet.

4. The conveyor system of claim 3 wherein the at least one design coat comprises one of a multi-colored figure and indicia.

5. The conveyor system of claim 3 wherein the at least one design coat further comprises a plurality of design coats, each coat providing one of a color and shape to the decorative design.

6. The conveyor system of claim 5 wherein the plurality of design coats are applied by a silk screening process.

7. The conveyor system of claim 1 wherein the decorative design on each of the plurality of pallets forms a continuous single decorative design.

8. The conveyor system of claim 1 wherein the decorative design on at least two of the plurality of pallets are unrelated.

9. The conveyor system of claim 1 wherein the decorative design is advertising.

10. A pallet for use on luggage carrousels comprising:
    a fabricated steel panel having a top, bottom, and side surface;

a ground coat of porcelain enamel applied to the top surface of the panel;

a finishing coat of porcelain enamel applied to the panel; and a plurality of design coats of porcelain enamel applied to the panel forming a decorative design on the panel, each of the design coats defining one of a shape and color of the decorative design.

11. The pallet of claim 10 wherein each of the plurality of design coats is applied by a silk screening process.

12. The pallet of claim 10 wherein the decorative design is advertising.

* * * * *